3,272,869
ORGANIC SULFIDE AND SULFOXIDE ANTIOXIDANTS AND METHOD FOR THEIR PREPARATION

Francis X. O'Shea, Wolcott, Conn., assignor to the United States Rubber Company, New York, N.Y., a corporation of New Jersey
No Drawing. Filed May 25, 1960, Ser. No. 31,542
6 Claims. (Cl. 260—607)

This invention relates to a new series of compounds referred to broadly as bis-(3,5-dihydrocarbyl-4-hydroxybenzyl)sulfides and the corresponding sulfoxides, which are useful as essentially nondiscoloring, nonstaining antioxidants for organic materials normally subject to oxidative deterioration such as elastomers, polyamides, polyolefins, fats, petroleum products and synthetic lubricants. The compounds of the invention are derived from 2,6-dihydrocarbylphenols and may be represented by the formula:

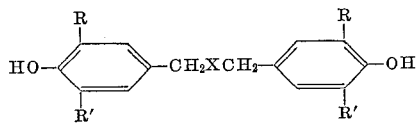

in which R is an alkyl, cycloalkyl or aralkyl radical containing less than 13 carbon atoms, R' is a tert.-alkyl, cycloalkyl or aralkyl radical containing less than 13 carbon atoms and X is a bivalent sulfur atom or the bivalent radical

The compounds may be prepared by several methods. A convenient synthesis is the reaction of a 2,6-dihydrocarbyl-4-(dialkylaminomethyl)phenol or a suitable quaternary salt thereof with an alkali metal sulfide, for example:

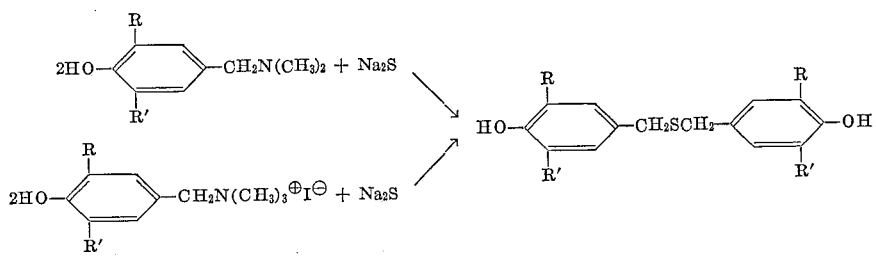

The compounds of my invention derived from hindered 2,6-dihydrocarbylphenols may be prepared by a novel synthetic method, i.e., the bis-(dihydrocarbylhydroxybenzyl)sulfides are prepared directly from the dihydrocarbylphenols by reaction with formaldehyde and an alkali metal sulfide in a suitable solvent, for example:

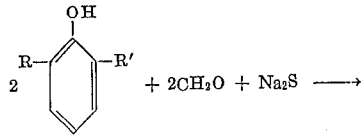

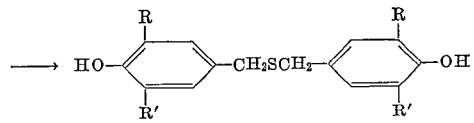

The sulfoxide compounds are prepared from the sulfides by oxidation according to classical procedures, for example, with hydrogen peroxide in glacial acetic acid.

The invention differs from the prior art in the following ways:

(1) The series of compounds of this invention is previously unreported. Such compounds are herein disclosed for the first time.

(2) Unlike the products described by L. A. Mikeska and A. R. Kittleson in U.S. Patent Nos. 2,415,833 and 2,488,134, the compounds of the present invention are of known composition and purity, usually readily isolated in crystalline form. The use of a dihydrocarbylphenol as starting material avoids the formation of undesirable resins and more highly condensed structures of the type found in the examples of Mikeska and Kittleson. Additionally, the compounds of the present invention contain the bridging group para to the phenolic hydroxyl. The superior antioxidant properties of the para-bridged compounds compared to the ortho-bridged compounds are apparent in the working examples to follow.

(3) In contrast to the products described by both Mikeska and Kittleson in U.S. Patents Nos. 2,415,833 and 2,488,134, and by Mikawa in Bull. Chem. Soc. Japan, 27, 50 (1954); C.A.: 49, 9274C, the compounds of the invention contain hydrocarbyl radicals ortho to the phenolic hydroxyl radical. This structural feature, especially when the hydrocarbyl radicals are bulky, gives the compounds superior antioxidant activity in many applications.

(4) Several of the compounds of the invention may be prepared directly from the dihydrocarbylphenols by a novel, practical, one-step synthetic method as described herein.

METHODS OF CARRYING OUT THE INVENTION

I. The compounds of the invention may be prepared by treating one molar equivalent of a compound of the formula

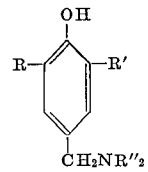

where R is an alkyl, cycloalkyl or aralkyl group of up to about twelve carbon atoms, R' is a tert.-alkyl, cycloalkyl or aralkyl group of up to about 12 carbon atoms and R" is an alkyl group, with 0.5 molar equivalent of an alkali metal sulfide in a suitable solvent at from 50° C. to about 150° C. The amine compounds are prepared by treating a dihydrocarbylphenol with formaldehyde and a dialkylamine in the ordinary Mannich type reaction The dihydrocarbylphenols which may be used include 2,6-xylenol;
2-methyl-6-t-butylphenol;
2,6-diisopropylphenol;
2,6-di-t-butylphenol;
2-methyl-6-cyclohexylphenol;
2,6-dicyclohexylphenol;
2-methyl-6-t-octylphenol;
2,6-di-t-octylphenol;
2-methyl-6-(alphamethylbenzyl)phenol;
2,6-di-(alpha-methylbenzyl)phenol;
2-methyl-6-dodecylphenol;
etc.

Any dialkylamine may be used but the low molecular weight members such as dimethylamine are preferable since the subsequent displacement reaction can be followed by evolution of the volatile amine product.

The reaction of the alkali metal sulfide is preferably carried out in a refluxing alcoholic solvent such as methanol, ethanol, isopropanol, ethylene glycol monoethyl ether, etc. The preferred alkali metal sulfide is sodium sulfide.

The compounds may also be prepared by reaction of a quaternary salt of the dihydrocarbyl-(dialkylaminomethyl)phenol with an alkali metal sulfide. Salts with methyl iodide are examples.

The sulfoxide compounds of the invention are prepared from the sulfides by oxidation according to classical procedures, for example, with hydrogen peroxide in glacial acetic acid.

II. The compounds of the invention derived from hindered 2,6-dihydrocarbylphenols may be prepared directly from the phenols by a novel, one-step method. The method invloves reacting a molar proportion of the phenol with one to about three molar proportions of formaldehyde and 0.5 to about two molar proportions of an alkali metal sulfide or hydrosulfide in an alcoholic solvent at about 25° C. to 150° C.

Examples of suitable phenols which may be employed in this novel reaction are 2-methyl-6-t-butylphenol;
2,6-diisopropylphenol;
2,6-di-t-butylphenol;
2,6-dicyclohexylphenol;
2-methyl-6-t-octylphenol;
2,6-di-t-octylphenol;
2-methyl-6-(alpha-methylbenzyl)phenol;
2,6-di-(alpha-methylbenzyl)phenol;
2-methyl-6-dodecylphenol; etc.

The formaldehyde may be an aqueous solution or in the form of para-formaldehyde. Examples of the alkali metal sulfide and hydrosulfide are $Na_2S$, $K_2S$, NaSH, KSH, etc.

The most suitable solvents for the reaction are methanol, ethanol, isopropanol and ethylene glycol monoethyl ether. Methanol is the preferred solvent since it allows solubility of the reactants and, in many cases, crystallization of the product directly from solution. The reaction is most conveniently carried out at the reflux temperature of the solvent for from 0.5 to about 24 hours. In those cases where the product does not precipitate on cooling, it may be readily isolated by removal of the solvent or by dilution with water. Liquid products may be isolated in this manner.

*Example 1.—Preparation of bis-(3,5-di-t-butyl-4-hydroxybenzyl(sulfide*

2,6-di-t-butylphenol (134 g., 0.65 mole), 100 ml. (1.23 moles) of 37% aqueous formaldehyde and 120 g. (0.5 mole) of sodium sulfide nonahydrate were dissolved in one liter of methanol in a 2-liter, 3-neck flask fitted with a stirrer, a condenser and a gas-inlet tube. The solution was saturated with a constant stream of nitrogen and heated to reflux for 30 minutes. During reflux a crystalline product began to precipitate. The mixture was cooled in ice and filtered. The white precipitate was washed well with water and dried in a 60° oven, yield= 138 g. (90.2%) M.P.=141–142° C. A sample recrystalized from methanol had M.P.=142–143° C.

*Analysis.*—Calc'd: C, 76.60; H, 9.85; S, 6.82. Found: C, 76.80; H, 9.74; S, 6.98.

*Example 2.—Preparation of bis-(3,5-di-t-butyl-4-hydroxybenzyl)sulfoxide*

Bis-(3,5-di-t-butyl-4-hydroxybenzyl)sulfide (58.7 g., 0.125 mol) was dissolved in one liter of glacial acetic acid with slight warming. The solution was cooled to 30° C. and 14.2 g. (0.125 mole) of 30% hydrogen peroxide was added in small portions. The temperature rose to 35° during the addition. The solution was allowed to stand at room temperature for three hours and was then diluted with 3 liters of ice water. The white solid precipitate was filtered, washed well with water, and dried, wt.=61 g. (quantitative), M.P.=149–154° C.

*Example 3.—Preparation of bis-(3-methyl-4-hydroxy-5-t-butylbenzyl)sulfide*

2-methyl-6-t-butylphenol (410 g., 2.5 moles), 205 g. (2.5 moles) of 37% aqueous formaldehyde and 300 g. (1.25 moles) of $Na_2S \cdot 9H_2O$ were dissolved in a mixture of 100 ml. of water and 600 ml. of methanol in a 2-liter, 3-neck flask fitted with a stirrer, condenser and thermometer. The solution was refluxed for one hour. The methanol was then distilled off and the aqueous layer decanted off the viscous product. The product was then rinsed with water and extracted with ether. The ether extract was washed with water, dilute hydrochloric acid and water. The organic layer was then evaporated down to a pale yellow solid product, yield=449 g. (93%). Recrystallization from aqueous methanol gave crystalline bis-(3-methyl-4-hydroxy-5-t-butylbenzyl)sulfide, M.P.= 116–117° C.

*Analysis*—Calc'd: C, 74.60; H, 8.87; S, 8.28. Found: C, 75.06; H, 8.90; S, 8.11.

*Example 4.—Preparation of bis-(3-methyl-4-hydroxy-5-t-butylbenzyl)sulfoxide*

Bis-(3-methyl-4-hydroxy-5-t-butylbenzyl)sulfide (31.2 g., 0.08 mole) was oxidized with 9.6 g. (0.08 mole) of 30% hydrogen peroxide in 500 ml. of glacial acetic acid as described in Example 2. Bis-(3-methyl-4-hydroxy-5-t-butylbenzyl)sulfoxide was obtained in quantitative yield, M.P.=170–175° (dec.) raised to 195° (dec.) after washing with warm chloroform.

*Analysis*—Calc'd: S, 7.97. Found: S, 7.93.

*Example 5.—Preparation of bis-(3,5-dimethyl-4-hydroxybenzyl)sulfide*

2,6-dimethyl-4-(dimethylaminomethyl)phenol (17.9 g., 0.1 mole) was refluxed under a stream of nitrogen with 12 g. (0.05 mole) of $Na_2S \cdot 9H_2O$ in 100 ml. of ethylene glycol monoethyl ether for six hours. The evolution of dimethylamine could be detected during the reflux period. The solution was then cooled and diluted with water containing 0.1 mole of HCl. The precipitated solid product was filtered off, dried and recrystallized twice from benzene affording 8.5 g. (56%) of bis-(3,5-di-methyl-4-hydroxybenzyl)sulfide, M.P., 100–101°.

*Analysis*—Calc'd: C, 71.52; H, 7.35; S, 10.60. Found: C, 72.80; H, 7.32; S, 10.17.

Example #6.—Preparation of bis-(3,5-dicyclohexyl-4-hydroxybenzyl)sulfide 2,6-dicyclohexylphenol (25.8 g., 0.1 mole) was refluxed with 16 g. (0.2 mole) of 37% aqueous formaldehyde and 18 g. (0.075 mole) of $Na_2S \cdot 9H_2O$ in 65 ml. of methanol for one hour. The mixture was filtered and the filtrate was poured into a large volume of cold water. The resultant precipitate was filtered off and dried affording 32 g. (76%) of bis-(3,5-dicyclohexyl-4-hydroxybenzyl) sulfide, M.P. 130–132° after crystallization from benzene.

*Analysis.*—Calc'd: S, 5.56. Found: S, 6.18.

Example #7.—Preparation of bis-[3-methyl-4-hydroxy-5-(alpha-methylbenzyl)benzyl]sulfide 2-methyl-6-(alpha-methylbenzyl)phenol (42.4 g., 0.2 mole) was refluxed with 16.2 g. (0.2 mole) of 37% aqueous formaldehyde and 24 g. (0.1 mole) of $Na_2S \cdot 9H_2O$ in 150 ml. of methanol for one hour. The mixture was poured into a large volume of cold water yielding bis-[3-methyl - 4 - hydroxy - 5 - (alpha - methylbenzyl)benzyl] sulfide, an amber viscous liquid.

Example #8

This example demonstrates the usefulness of the compounds as fat antioxidants using the Schaal oven aging test. Prime steam pork fat, 150 g., was melted and 15 mg. of the chemical mixed in. A peroxide number by the potassium iodide-starch method was then taken as the zero reading. The samples were placed in a 60° C. oven and readings were taken after 3 days and then at one week intervals. A peroxide number of 30 is considered to be failure.

| Compound: | Days to failure |
|---|---|
| (1) Blank | 3 |
| (2) 2,6-di-t-butyl-4-methylphenol | 11–24 |
| (3) Bis - (3,5 - di - t - butyl-4-hydroxybenzyl) sulfoxide | 11–24 |
| (4) Bis - (3 - methyl - 4 - hydroxy - 5-t-butylbenzyl)sulfoxide | 24–32 |
| (5) Bis - (3,5 - di - t - butyl-4-hydroxybenzyl) sulfide | 32–38 |
| (6) Bis - (3 - methyl - 4 - hydroxy - 5-t-butylbenzyl)sulfide | 38–46 |
| (7) Bis - (3,5 - dimethyl - 4 - hydroxybenzyl) sulfide | >46 |

A comparison of my compounds with a leading commercial antioxidant (2) is shown.

Example #9

Several compounds were evaluated as fat antioxidants in the Schaal oven test as described in Example #8.

| Compound: | Days to failure |
|---|---|
| (1) Bis-(4-hydroxybenzyl)sulfide | 17–25 |
| (2) Bis - (2 - hydroxy - 3 - t - butyl-5-methylbenzyl)sulfide | 7–17 |
| (3) Bis - (3,5 - dimethyl - 4 - hydroxybenzyl) sulfide | 39–52 |
| (4) Bis - (3 - methyl - 4 - hydroxy - 5-t-butyl-benzyl)sulfide | 39–52 |

This example demonstrates the superiority of my compounds to a corresponding ortho-bridged compound (2) and to a para-bridged compound containing no ortho substituents (1).

Example #10

This example demonstrates the usefulness of the compounds as antioxidants for polyethylene. The compound was milled into uninhibited polyethylene on the basis of 0.1 part of the antioxidant per 100 parts of polyethylene. A sample film of 5-mil thickness was pressed out and placed in an oven at 140° C. Infra-red absorption spectra of the samples revealed a sharp carbonyl development at a time coinciding with visual degradation.

| Compound: | Hours to failure |
|---|---|
| (1) Blank | 8 |
| (2) Bis - (3,5 - dimethyl - 4 - hydroxybenzyl) sulfide | 72 |
| (3) Bis - (3,5 - diisopropyl - 4 - hydroxybenzyl) sulfide | 72 |
| (4) Bis - (3-methyl-4-hydroxy-5-t-butylbenzyl) sulfide | 80 |
| (5) Bis - (3-methyl-4-hydroxy-5-t-butylbenzyl) sulfoxide | >80 |

Example #11

A sample of polyethylene containing 0.1% of the antioxidant was placed in an oxygen absorption apparatus at 140° C. The length of the induction period preceding rapid absorption of oxygen was observed.

| Compound: | Induction period, hours |
|---|---|
| (1) Blank | <24 |
| (2) Bis - (3-methyl-4-hydroxy-5-t-butylbenzyl) sulfide | 450 |

Example #12

A natural rubber composition was prepared in accordance with the following recipe:

| Masterbatch #1: | |
|---|---|
| Pale crepe | 98.65 |
| Zinc oxide (XX72) | 10.00 |
| Lithopone | 60.00 |
| Finely divided $CaCO_3$ (whiting) | 60.00 |
| Zinc laurate (Laurex) | 0.50 |
| Sulfur | 3.00 |
| Masterbatch #2 | 1.50 |
| | 233.65 |

| Masterbatch #2: | |
|---|---|
| Pale crepe | 90.0 |
| Tetramethyl thiuram monosulfide (Monex) | 10.0 |
| | 100.0 |

The antioxidants (1 part) were then milled into 233.65 parts of masterbatch #1 and samples were cured at 274° F. for 30 minutes. Tensile bars were aged in an oxygen bomb for 96 hours at 70° C. The percent retention of tensile strength after aging demonstrates the activity of the compounds as rubber antioxidants.

| Compound: | Percent tensile retained |
|---|---|
| (1) Blank | 6 |
| (2) Bis-(4-hydroxybenzyl)sulfide | 14 |
| (3) Bis - (2 - hydroxy - 3-t-butyl-5-methylbenzyl) sulfide | 14 |
| (4) Bis - (3,5 - dimethyl - 4 - hydroxybenzyl)sulfide | 63 |
| (5) Bis - (3 - methyl-4-hydroxy-5-t-butylbenzyl) sulfoxide | 68 |
| (6) Bis - (3,5 - di - t-butyl-4-hydroxybenzyl)sulfide | 79 |
| (7) Bis - (3 - methyl - 4-hydroxy-5-t-butylbenzyl) sulfide | 93 |
| (8) Antioxidant "A" | 75 |

Comparison to a commercial alkylated bis-phenol type antioxidant (8) is shown. The example also demonstrates the superiority of my compounds to a corresponding ortho-bridged compound (3) and to a para-bridge compound containing no ortho substituents (2).

Example #13

To demonstrate the usefulness of the compounds as antioxidants for gasoline, a sample of catalytically cracked gasoline was used in the ASTM–D–525 oxidation induction period test. A concentration of 40 mg. of antioxidant per liter of gasoline was used.

Compound: Minutes to failure
(1) Blank _____ 141
(2) bis-(3-methyl - 4 - hydroxy-5-t-butylbenzyl) sulfide _____ 315

*Example #14*

The use of these compounds in petroleum oils is demonstrated by the ASTM–D–943 oxidation test for turbine oils. The concentration of antioxidant was 0.1%.

Compound: Hours to failure
(1) Blank _____ <200
(2) bis-(3-methyl-4-hydroxy-5-t-butylbenzyl) sulfide _____ >800

Having thus described my invention, what I claim and desire to protect by Letters Patent is:

1. The bis-(3,5-dihydrocarbyl-4-hydroxybenzyl)sulfoxides as represented by the structural formula:

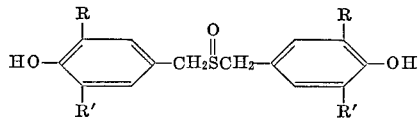

wherein R is selected from the group consisting of alkyl, cycloalkyl and aralkyl radicals containing less than 13 carbon atoms and R' is selected from the group consisting of tert-alkyl, cycloalkyl and aralkyl radicals containing less than 13 carbon atoms.

2. Bis - (3-methyl-4-hydroxy-5-t-butylbenzyl)sulfoxide.

3. A method of preparing bis-(3,5-dihydrocarbyl-4-hydroxybenzyl)sulfides as represented by the structural formula:

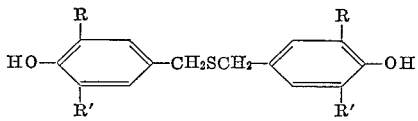

wherein R is selected from the group consisting of alkyl, cycloalkyl, and aralkyl radicals containing less than 13 carbon atoms and R' is selected from the group consisting of tert-alkyl, cycloalkyl and aralkyl radicals containing less than 13 carbon atoms, comprising reacting one molar proportion of a 2,6-dihydrocarbylphenol with one to about three molar proportions of formaldehyde and one-half to about two molar proportions of a compound selected from the group consisting of alkali metal sulfide and hydrosulfide and in a solvent selected from the group consisting of lower alkanols and ethylene glycol monoethyl ether at a temperature of from about 25° C. to about 150° C. for a period of from about 0.5 to about 24 hours.

4. A method as in claim 3, wherein the dialkylphenol is 2-methyl-6-t-butylphenol.

5. A method as in claim 3, wherein the alkali metal sulfide is sodium sulfide.

6. A method as in claim 3, wherein the solvent is methyl alcohol.

References Cited by the Examiner

UNITED STATES PATENTS

| | | | |
|---|---|---|---|
| 2,488,134 | 11/1949 | Mikeska | 260—609 |
| 2,831,030 | 4/1958 | Chenicek | 260—609 |
| 2,877,189 | 3/1959 | Olin | 252—401 |
| 2,936,290 | 5/1960 | Gysling et al. | 252—401 |
| 2,976,324 | 3/1961 | Long et al. | 260—609 |

OTHER REFERENCES

Bamberger, Ber. Deut. Chem., vol. 36, pp. 2028–2036 (1903).

Gierer et al.: Ber. Deut. Chem., vol. 90, pp. 1240–1250 (1957).

Mikawa, C. A., vol. 49, page 9274c (1955).

CHARLES B. PARKER, *Primary Examiner.*

JULIUS GREENWALD, ABRAHAM H. WINKELSTEIN, *Examiners.*

J. E. MOERMOND, DANIEL D. HORWITZ, FLOYD D. HIGEL, *Assistant Examiners.*